(12) United States Patent
Shostak (10) Patent No.: US 8,175,887 B2
(45) Date of Patent: May 8, 2012

(54) SYSTEM AND METHOD FOR IMPROVING RECOGNITION ACCURACY IN SPEECH RECOGNITION APPLICATIONS

(75) Inventor: Robert E. Shostak, Portola Valley, CA (US)

(73) Assignee: Vocera Communications, Inc., San Jose, CA (US)

( * ) Notice: Subject to any disclaimer, the term of this patent is extended or adjusted under 35 U.S.C. 154(b) by 174 days.

(21) Appl. No.: 12/253,898

(22) Filed: Oct. 17, 2008

(65) Prior Publication Data

US 2009/0043587 A1 Feb. 12, 2009

Related U.S. Application Data

(63) Continuation of application No. 11/000,590, filed on Nov. 30, 2004, now Pat. No. 7,457,751.

(51) Int. Cl.
*G10L 11/00* (2006.01)
(52) U.S. Cl. ...................................................... 704/275
(58) Field of Classification Search .............. 455/569.1, 455/563; 704/251, 254
See application file for complete search history.

(56) References Cited

U.S. PATENT DOCUMENTS

| | | | |
|---|---|---|---|
| 5,067,149 A | 11/1991 | Schneid et al. | |
| 5,267,305 A | 11/1993 | Prohs et al. | |
| 5,515,426 A * | 5/1996 | Yacenda et al. | 379/201.07 |
| 5,596,634 A * | 1/1997 | Fernandez et al. | 379/210.01 |
| 5,691,973 A | 11/1997 | Ramstrom et al. | |
| 5,960,004 A | 9/1999 | Ramstrom et al. | |
| 5,987,408 A * | 11/1999 | Gupta | 704/231 |
| 5,987,410 A | 11/1999 | Kellner et al. | |
| 6,381,341 B1 * | 4/2002 | Rhoads | 382/100 |
| 6,480,597 B1 | 11/2002 | Kult et al. | |
| 6,565,000 B2 * | 5/2003 | Sehr | 235/384 |
| 6,761,637 B2 * | 7/2004 | Weston et al. | 463/42 |
| 7,039,589 B2 * | 5/2006 | Whitham | 704/270 |
| 7,172,113 B2 * | 2/2007 | Olenick et al. | 235/380 |
| 7,302,392 B1 | 11/2007 | Thenthiruperai et al. | |
| 7,487,095 B2 | 2/2009 | Hill et al. | |
| 7,606,714 B2 | 10/2009 | Williams et al. | |
| 2002/0118811 A1 | 8/2002 | Davis et al. | |
| 2004/0157648 A1* | 8/2004 | Lightman | 455/566 |
| 2005/0089150 A1 | 4/2005 | Birkhead et al. | |
| 2006/0049936 A1* | 3/2006 | Collins et al. | 340/539.11 |

FOREIGN PATENT DOCUMENTS

WO   WO 03/021990   3/2003

OTHER PUBLICATIONS

Canadian Office Action dated Dec. 3, 2010 in corresponding CA Patent Application No. 2,588,604.

* cited by examiner

*Primary Examiner* — Michael N Opsasnick
(74) *Attorney, Agent, or Firm* — DLA Piper LLP (US)

(57) ABSTRACT

A speech recognition system and method are provided to correctly distinguish among multiple interpretations of an utterance. This system is particularly useful when the set of possible interpretations is large, changes dynamically, and/or contains items that are not phonetically distinctive. The speech recognition system extends the capabilities of mobile wireless communication devices that are voice operated after their initial activation.

17 Claims, 4 Drawing Sheets

SYSTEM AND METHOD FOR IMPROVING RECOGNITION ACCURACY IN SPEECH RECOGNITION APPLICATIONS

PRIORITY CLAIM

This application claims the priority under 35 USC 120 to U.S. patent application Ser. No. 11/000,590 filed on Nov. 30, 2004 and entitled "SYSTEM AND METHOD FOR IMPROVING RECOGNITION ACCURACY IN SPEECH RECOGNITION APPLICATIONS" know U.S. Pat. No. 7,457,751 issued on Nov. 25, 2008), the entirety of which is incorporated herein by reference.

FIELD OF THE INVENTION

This invention relates generally to a system and method for correctly distinguishing among multiple possible interpretations of utterances in speech recognition applications. In particular, this invention relates to a system and method for distinguishing among multiple possible interpretations of utterances in the speech recognition capability of a wireless communications system.

BACKGROUND OF THE INVENTION

Various different wireless communication devices are well known and form a large part of our everyday lives. Examples of the well-known wireless communication devices include walkie-talkies and other simple two-way radios, cellular phones, pagers, and Palm-type handheld devices that permit e-mail or Internet access. Simple two-way radios require no network infrastructure, since each radio communicates directly with each other radio. However, simple two-way radios also offer none of the network-based features people expect of a modern communications system, such as the ability to set up a private connection between two communications devices using an identifier such as a phone number or name. Each of the other examples given of wireless communications devices requires an expensive network infrastructure to operate correctly.

One area where wireless communication devices can play an important role is in the workplace, to allow mobile employees to communicate with one another. Many workplaces have already installed a wireless computer network to support wireless devices such as laptop computers. These wireless computer networks use a standard wireless networking protocol, such as one of the 802.11 standards, and consist of one or more wireless access points, typically installed in the ceiling of a building. The access points communicate with various wireless devices using the selected standard wireless networking protocol, and communicate with each other, and with other computers, over a standard wired computer network, such as Ethernet. Since a full-featured modern communication system requires a network infrastructure to operate correctly, it makes sense to develop a wireless communications system, which uses a typical wireless computer network (such as one based on an 802.11 standard) as its network infrastructure. This makes it possible to deploy a wireless communications system without the need to deploy a completely separate parallel wireless network.

An important feature of communications systems in general, and wireless communications systems in particular, is the ability to interpret user utterances and to perform appropriate actions based upon those utterances, a capability which will be referred to as "speech recognition." Speech recognition is most important when a wireless communications system employs miniature communication devices that are too small to provide a keypad or directory. In such a system, speech recognition becomes more of a necessity than a convenience, because voice commands provide the primary means of controlling the wireless devices.

Various different speech recognition systems are well known and form a large part of our everyday lives. Examples of the well known speech recognition systems include systems for determining airline flight information, systems for accessing billing information, systems for providing directory assistance, systems for allowing service activation, and systems for navigating through a branching tree of possible choices in a customer contact center. Each of these systems processes an utterance by matching it with a single interpretation in the set of all possible interpretations. The set of all possible interpretations of an utterance will be referred to as the "recognition space." Note that the recognition space in a speech recognition system is always finite.

All speech recognition systems require an accurate interpretation of an utterance to perform an appropriate action; however, speech recognition systems are not foolproof and use probabilities to determine the likeliness of each possible utterance interpretation. A number of factors affect speech recognition accuracy, including the phonetic distinctiveness of items in the recognition space, the ability of system users to dynamically change the recognition space, the accent of a person issuing an utterance, simple mispronunciations, and so on. Each of these factors is greatly affected by the size of the recognition space. A large recognition space increases the likelihood of confusability and causes all of the factors that impact speech recognition to become severe problems.

One example of a potentially very large recognition space is a directory of user names, which can exist when a communications system has a large number of users who rely on voice commands to contact each other. This problem grows as the communications system itself grows, effectively providing a limit to the continued success of the system. All communications systems, such as telephones or fax machines, become more useful as more people employ them. When a communications system with a spoken user directory acquires a large number of users, however, the size of the directory itself limits the effectiveness of the system, because it significantly reduces the accuracy of speech recognition.

A speech recognition system would realize a significant benefit by being able to find accurate interpretations of utterances in a large recognition space, especially when one or more of the following situations occur: entries in the recognition space change dynamically, the recognition space contains entries that are not phonetically distinctive, entries in the recognition space are easily mispronounced, and/or users of the system speak with accents. It is in light of this wireless communication and speech recognition background that the significant improvements of the present invention have evolved.

SUMMARY OF THE INVENTION

The present invention advantageously provides a method, and an associated system, by which to improve the accuracy of a speech recognition system when the size of the recognition space is large, especially when one or more of the following situations occur: entries in the recognition space change dynamically, the recognition space contains entries that are not phonetically distinctive, entries in the recognition space are easily mispronounced, and/or users of the system speak with accents.

The preferred embodiment of the present invention includes, at a minimum, a controlling computer that runs application software (including a speech recognition engine) and a customer configuration database. The preferred embodiment of the present invention also includes one or more Badges, which are lightweight, wearable, wireless devices that users employ to communicate with each other. The preferred embodiment requires speech recognition accuracy because the Badges are miniature devices without a keypad or directory. A basic installation of the preferred embodiment assumes an existing 802.11 wireless network infrastructure. In the preferred embodiment, the Badge can be completely voice controlled after an initial button click. To use the system, a person activates the Badge with a button click, issues a verbal command into the Badge, and begins speaking when the system establishes communication with the intended party's Badge or telephone.

As an example of this use, suppose a person wearing a Badge wants to speak to Maria Bettini, who is also wearing a Badge. The person initiating the communication presses a button on the Badge, receives an audible prompt, and then utters the command "Call Maria Bettini." The Badge digitizes this utterance and transmits it as data packets over the wireless network to the controlling computer. The speech recognition engine in the controlling computer associates the argument in the command (Maria Bettini) with a user in the configuration database, and the controlling computer then establishes communication between the Badge of the person who initiated the call and Maria Bettini's Badge. After establishing the communication session, the controlling computer drops out of the process, the two Badges communicate directly with each other over the wireless net, and no additional speech recognition is performed.

In the preferred embodiment, a person wearing the Badge can utter a command that comprises a verb and an argument. The verb specifies the action that the person initiating the communication wants to perform with the Badge. Examples of verbs include "Call," "Send a message to," and "Broadcast to." The system defines a static set of verbs; that is, the available verbs are the same at every customer installation. The argument specifies the name of a Badge user (such as "Maria Bettini"), a group of Badge users (such as "Fifth Floor Nurses"), or an address book entry (a person or place that does not have a Badge, but whose name and phone number are entered in the customer configuration database, such as "Poison Control"). The set of possible arguments is specified in the customer configuration database and is dynamic—that is, the database entries differ at every customer installation, and users at customer installations can add and remove database entries continually. Because the set of arguments contains not just Badge users but also groups of Badge users and outside entities, the number of possible arguments can be quite large. Together, the entire set of words and phrases the system can recognize—the set of verbs and arguments—composes the recognition space.

A speech recognition engine typically examines an utterance and attempts to match it with one or more elements in the recognition space. The speech recognition engine may return the n-best matches it finds to another system for additional processing. The application software configures the value of "n," so the speech recognition engine may return, for example, the three (or fewer) best matches it finds. This n-best subset of the recognition space is referred to as the "result set." The speech recognition engine orders the result set and assigns each element a numeric rating to represent the probability of each result's accuracy.

While the correct match is usually in the result set that the speech recognition engine returns, it is often not the result that the engine has ranked as most probable. Many factors outside the control of the recognition engine affect these probability rankings, especially the size of the recognition space, because the likelihood of multiple results being phonetically similar increases significantly as the size of the recognition space grows. Consequently, the application software may need to perform additional processing on the result set to find the single most probable result.

Two aspects of the present invention, the Inner Circle mechanism and the Say Or Spell mechanism, each independently improves the accuracy of a speech recognition system. The Inner Circle mechanism is based upon the principle that users are statistically more likely to contact a certain small subset of parties than they are to contact parties outside that subset. When used to filter a set of results returned by the speech recognition engine, the Inner Circle mechanism effectively reduces the size of a large recognition space. The Say Or Spell mechanism is based upon the principle that a speech recognition engine more accurately identifies an utterance that contains a large number of syllables. The Say Or Spell mechanism allows users to either speak the name or spell the name of a person they are trying to contact, and also to either speak the verb or spell the verb in the voice command. When users spell the name of a contact, for example, they are effectively uttering many more syllables than they would be when they simply speak the name.

In the first aspect of the present invention, the Inner Circle mechanism effectively reduces the size of the recognition space by filtering phonetically similar matches from the result set returned by a speech recognition engine. The Inner Circle mechanism contains both a database and an algorithm. In the preferred embodiment, the Inner Circle database maintains the set of users, groups, and address book entries that an individual Badge user contacts most frequently. Each Badge user has his or her own Inner Circle database, which is typically different from the Inner Circle database of another Badge user. Each user's Inner Circle database is the subset of recognition space elements that the user is most likely to reference in a command. The Inner Circle algorithm prefers elements of the result set that are members of the Inner Circle database of the user who issued the voice command. A communications system that needs to perform additional processing on a recognition engine's result set can use the Inner Circle mechanism as a filter. For example, if a result set contains the phonetically similar results "Call Phil Rains" and "Call Phil Rein," the Inner Circle mechanism can filter the latter result when "Phil Rein" is not in the Inner Circle database of the user who issued the voice command, because that user is statistically unlikely to contact "Phil Rein." An administrator may explicitly populate the Inner Circle for each user, or the individual users themselves may implicitly and adaptively populate the Inner Circle as the system learns their preferences.

In the second aspect of the present invention, the Say or Spell mechanism allows a person using a speech recognition system to specify a party in a voice command by spelling its name or speaking its name, and also to specify a verb in a voice command by spelling the verb or speaking the verb. In the preferred embodiment, a Badge user can reference a person, for example, by spelling the first name, last name, or both. Similarly, a Badge user can reference a place or a group by spelling its name. For example, to call the user "Peter Wong," a Badge user can utter the commands "Call P-E-T-E-R," "Call W-O-N-G," or "Call P-E-T-E-R-W-O-N-G." The spelling usually has value even if it is incorrect, as the speech recognition engine will still likely take the misspelled name as a best match for the utterance, as long as most of the letters are correct. Spellings add so much differentiation to most names that they are often good for referring to a name when a similar name is already in a user's Inner Circle. Normally an Inner Circle entry takes precedence in interpreting an utterance, making it difficult to refer to the non-Inner Circle name. By specifying a spelling, a Badge user can force the system to differentiate between an Inner Circle name and another name, thus excluding the Inner Circle name from the result set.

The Inner Circle and Say Or Spell aspects of the present invention each provide a method and system for improving recognition accuracy in a large recognition space. It will be appreciated by those skilled in the art that both the Inner Circle mechanism and the Say Or Spell mechanism have speech recognition applications in addition to the preferred embodiment. A more complete appreciation of the present invention and its scope can be obtained from the accompanying drawings, which follow the detailed description of the presently preferred embodiment of the invention and the appended claims.

DETAILED DESCRIPTION OF A PREFERRED EMBODIMENT

The invention is particularly applicable to a voice-controlled wireless communications system that uses wireless access points based on an IEEE 802.11 protocol and an Ethernet wired computer network to provide the network infrastructure for the communications system. It is in this context that the invention will be described. It will be appreciated by those skilled in the art, however, that the system for improving speech recognition accuracy in accordance with the invention has greater utility, since it can be implemented to provide this capability for various speech recognition engines in various communication systems, so that it may be applicable to other systems where it is desirable to speech recognition accuracy.

Figure 1:
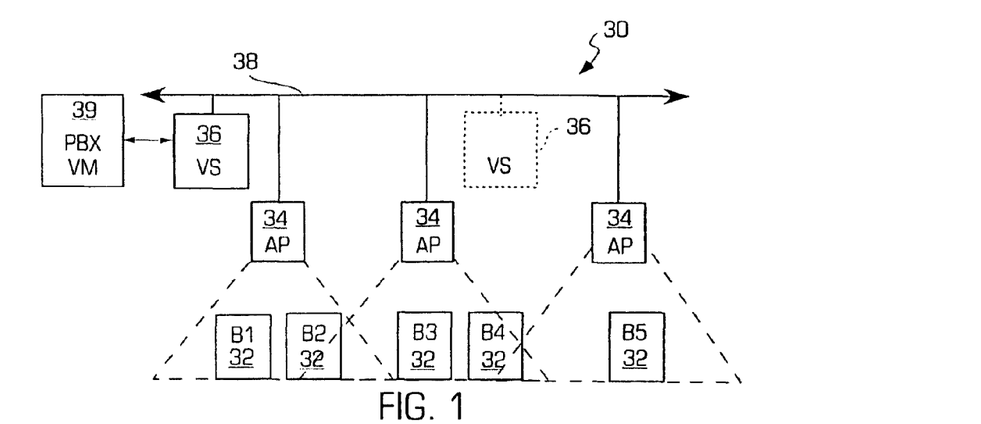
FIG. 1 depicts an example of a preferred embodiment of the voice-controlled wireless communications system in accordance with the invention.

FIG. 1 illustrates an example of a preferred embodiment of the voice-controlled wireless communications system 30 in accordance with the invention. In particular, the system comprises a plurality of wireless communication devices referred to as Badges 32 (marked B1-B5 in this example), one or more wireless access points 34 (marked AP) and one or more central computers referred to as controlling computers 36 (marked VS), as shown. The access points 34 in FIG. 1 may be standard off-the-shelf wireless access points, such as a standard 802.11 access point in a preferred embodiment, which collectively implement a wireless network allowing the Badges 32 to communicate with other components of the communications system 30. The access points 34 communicate with each other, and with the controlling computer 36, over a computer network 38 which may be a local area Ethernet network in a preferred embodiment. Taken together, the access points 34 and the computer network 38 provide the network infrastructure for the wireless communications system 30. Any of the controlling computers 36 may also be interfaced to a telephone system such as a Private Branch Exchange (PBX) system 39, which allows the wireless communications system 30 to communicate with common telephone communication systems. Each Badge 32 is a wireless communications device that is capable of communicating with an access point 34, and therefore is also capable of communicating with the controlling computer 36 in order to implement the desired wireless communication functions. Each Badge 32 serves as one of the primary communications endpoints of the system.

Figure 2:
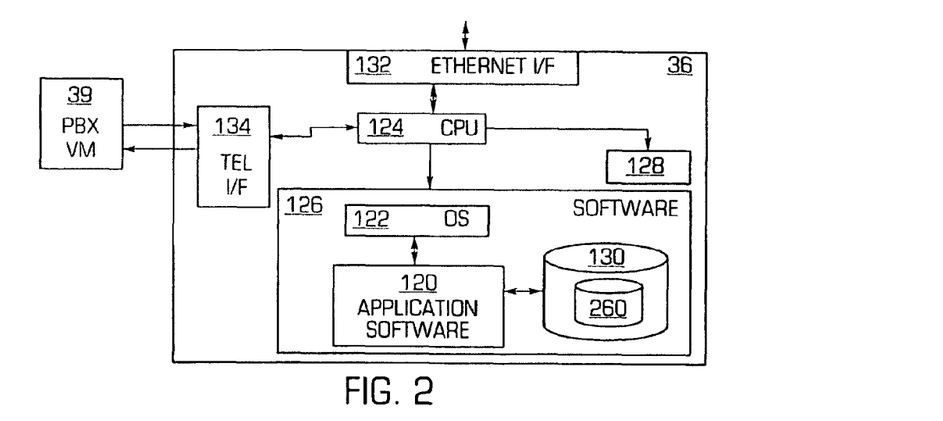
FIG. 2 is a block diagram of an exemplary controlling computer (VS) shown in FIG. 1 in accordance with the invention.

FIG. 2 is a block diagram of an exemplary controlling computer 36 in accordance with the invention. The controlling computer 36 is responsible for the overall control of the system. In a preferred embodiment, the controlling computer 36 may be a typical off-the-shelf computer system, such as a typical server computer, the hardware details of which are well known. In more detail, the central computer 36 may include a central processing unit (CPU) 124 and a persistent storage device 128, such as a hard disk drive, an optical drive, a flash memory or the like. The controlling computer may also have telephony interface hardware 134 that permits the controlling computer to interface to a telephone and/or Public Branch Exchange (PBX) system 39, and a computer network interface 132, such as the Ethernet interface shown, that permits the controlling computer to connect to the computer network. In addition, the controlling computer 36 must have a memory 126 that stores software currently being executed by the CPU 124. This software includes at a minimum an operating system 122, application software 120 to implement the wireless communication functions of the wireless communications system, and a database 130 to store information associated with the wireless communications system. This database information includes but is not limited to an Inner Circle database 260.

The database 130 stores user information, including the assignment of users to devices, speech files containing user name prompts and voice signatures, user preferences and so forth. It also keeps track of the whereabouts of users as they roam within the communications network. In large corporate installations, this component may interface to global employee databases maintained by the customer. Some information fields in database 130, for each user of the system, may include but are not limited to the following: user name, login name, password, alternative name/identifier, phone number and address, voicemail greeting message, ring tone, caller identifier status (on/off), buddy list, block list of calls to block, message forwarding service status (on/off and if on, to what number), distribution groups (e.g. "Memory Marketing Team"), saved messages, and device serial number.

Figure 3:
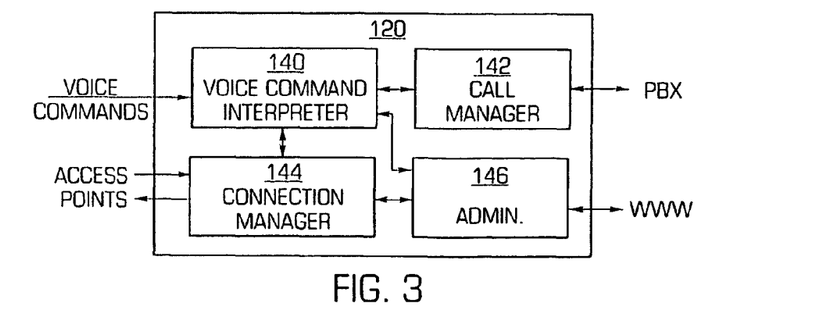
FIG. 3 is a block diagram of the application software component of the controlling computer shown in FIG. 2 in accordance with the invention.

FIG. 3 illustrates more details of the application software 120. In a preferred embodiment of the invention, the application software comprising one or more portions of code wherein each portion of the code has a plurality of lines of computer instructions that implement the operations and functions described below. The software may include a voice command interpreter 140, a call manager 142, a connection manager 144, and an administrator 146 that are interconnected together and exchange commands and data with each other as shown. The voice command interpreter 140 has responsibility for interpreting and executing voice-based commands received from the Badges. The call manager 142 has responsibility for the set-up and the breakdown of two-party and multi-party calls (including external calls) and maintaining status information associated with these calls. The connection manager 144 is the component that is responsible for managing access points and the connections among Badges and access points. It also supports a hand-off from one access point to another as a Badge roams about the network. The administrator module 146 supports administrator-level and user-level configuration and monitoring of the system through a web browser interface as shown.

Figure 4A:
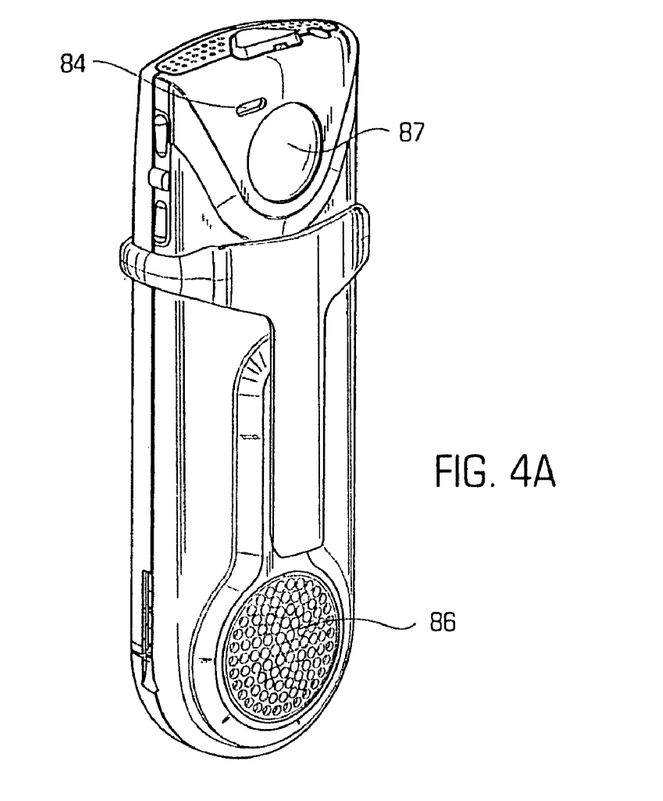
FIG. 4A depicts an embodiment of each Badge (B1, B2, ..., B5) shown in FIG. 1 in accordance with the invention.
Figure 4B:
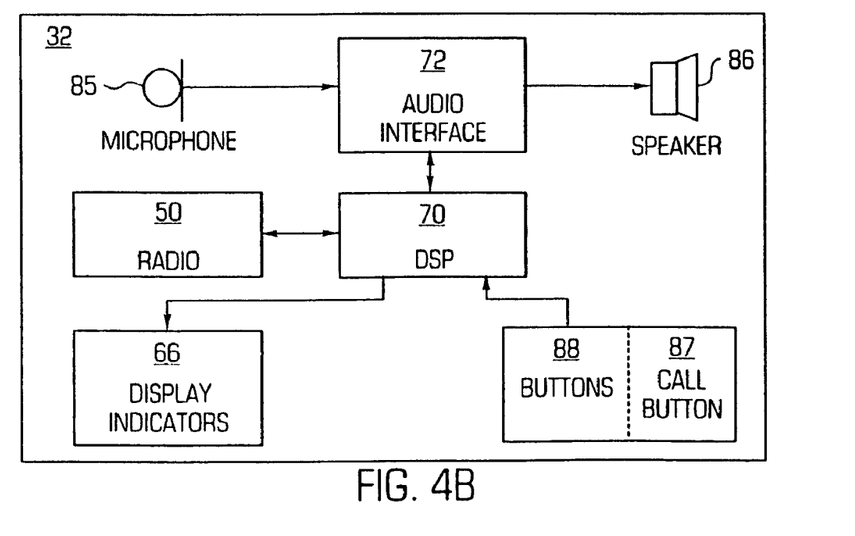
FIG. 4B depicts a block diagram illustrating the hardware components of the Badge shown in FIG. 4A in accordance with the invention.

FIG. 4A illustrates a preferred embodiment of the communications Badge 32 in accordance with the invention, and FIG. 4B is a block diagram illustrating the hardware components of the Badge 32 in accordance with the invention. In a preferred embodiment, each Badge 32 is a portable, battery-powered, wireless device that supports hands-free, full duplex voice communications using a small microphone 85 (mounted behind microphone port 84) and a speaker 86. The Badges are sufficiently small and lightweight enough that they may be clipped onto a shirt pocket of the user or may be worn on a lanyard around the neck of a user. Each Badge 32 has a Digital Signal Processor (DSP) 70 that serves as a programmable controller of all other Badge hardware. The DSP 70 may include a processor and memory that stores the software resident on each Badge. The DSP 70 is interfaced to a radio 50 for communication with the communication system's access points. The DSP is interfaced to the microphone 85 and the speaker 86 through an audio interface 72. The DSP is also interfaced to various display indicators 66 and to various buttons 88 including a "Call Button" 87, which is generally used to initiate communications sessions. Further details about the Badge 32 are provided in pending U.S. patent application Ser. No. 09/947,235, which is incorporated herein by reference.

Figure 5:
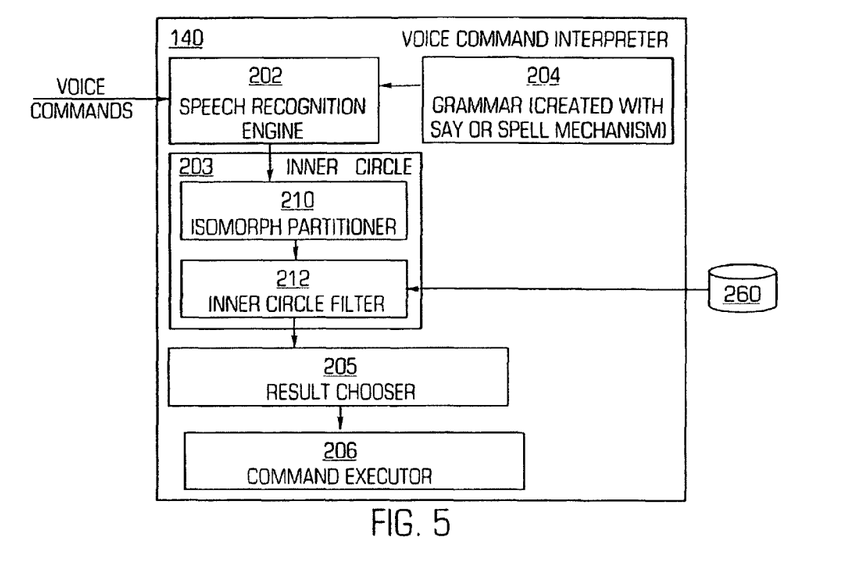
FIG. 5 depicts a block diagram illustrating more details of the voice command interpreter shown in FIG. 3 in accordance with the invention.

FIG. 5 illustrates more detail of the voice command interpreter 140. In the preferred embodiment, the voice command interpreter 140 may include a grammar store/database 204 (developed by the Say Or Spell mechanism), a speech recognition engine 202 (such as the commercially available Nuance speech recognition engine), an Inner Circle mechanism 203, a result chooser 205, and a command executor 206. In more detail, the Inner Circle mechanism 203 contains an Isomorph Partitioner 210 and an Inner Circle Filter 212, which references the Inner Circle database 260. In a preferred embodiment, the voice command interpreter (and each of the elements set forth above) is implemented in software that has one or more portions of code with each portion of code having a plurality of lines of computer instructions.

One aspect of the present invention, the Inner Circle mechanism 203, provides a set of software instructions to determine the single best match in the n-best result set returned by the speech recognition engine 202. Without the Inner Circle mechanism 203, the speech recognition engine 202 passes the n-best result set (also known as one or more voice command interpretations) directly to the result chooser 205, which uses some other heuristic to select a single result, possibly only on the probability ratings provided by the speech recognition engine. Each voice command interpretation result in the result set has a verb portion (that specifies an action to be taken, such as "Call") and an argument portion (that specifies the entity to which a command is performed, such as Broadcast "Oncology" which would ask the system to broadcast a voice message to the Oncology group.) The discovery of the Inner Circle mechanism 203 enhances the existing art considerably, because it uses data that is not available to the speech recognition engine 202 to filter entries that are statistically unlikely from the n-best result set. The Inner Circle mechanism 203 then passes a narrower set of entries to the result chooser 205. In many cases, the Inner Circle mechanism 203 can filter all extraneous entries from the result set, passing only the single best match to the result chooser 205, which can then pass the best match to the command executor 206 without taking any action.

In more detail, the speech recognition engine 202 passes the n-best result set to the Isomorph Partitioner component 210 of the Inner Circle mechanism 203. The Isomorph Partitioner 210 partitions the result set into one or more isomorphic subsets. An isomorph is an element in the result set that is structurally similar to another element in the result set. That is, two or more elements in the result set are isomorphs when each has the same verb but different arguments. The Isomorph Partitioner 210 passes the isomorphic subsets that it outputs to the Inner Circle Filter 212, which examines all the results in each subset, one pair at a time. The Inner Circle Filter 212 opens the first isomorphic subset and examines the first pair of results it contains. The Inner Circle Filter 212 compares the arguments in these isomorphic results to the Inner Circle Database 260 of the person who uttered the command. The Inner Circle Filter 212 then discards any result whose argument is not in the Inner Circle Database 260, buffers any surviving results, and examines the next pair of results in the first isomorphic subset, filtering and buffering results as necessary. The Inner Circle Filter 212 continues examining each pair of results until it has finished processing the first isomorphic subset, and then buffers this reduced subset that excludes the filtered elements. The Inner Circle Filter 212 then examines every other isomorphic subset the same way, until it has reduced each isomorphic subset as much as possible.

This Inner Circle processing can result in three possible cases for each isomorphic subset:
- If Inner Circle processing filters every element in an isomorphic subset, the Inner Circle Filter 212 passes all the original elements in the isomorphic subset to the Result Chooser 205.
- If Inner Circle processing filters no elements in an isomorphic subset, the Inner Circle Filter 212 passes all the original elements in the isomorphic subset to the Result Chooser 205.
- If Inner Circle processing filters some elements in an isomorphic subset, the Inner Circle Filter 212 passes the remaining elements in the isomorphic subset to the Result Chooser 205.

When the Result Chooser 205 receives a single isomorphic subset containing a single element, that element is treated as the preferred choice, and the Result Chooser 205 does not perform further processing. When the Result Chooser 205 receives a single isomorphic subset containing multiple results, or when it receives multiple isomorphic subsets, the Result Chooser 205 attempts to find a preferred choice using another heuristic such as the probability ratings provided by the speech engine. Note that the Result Chooser 205 is known technology.

Figure 6:
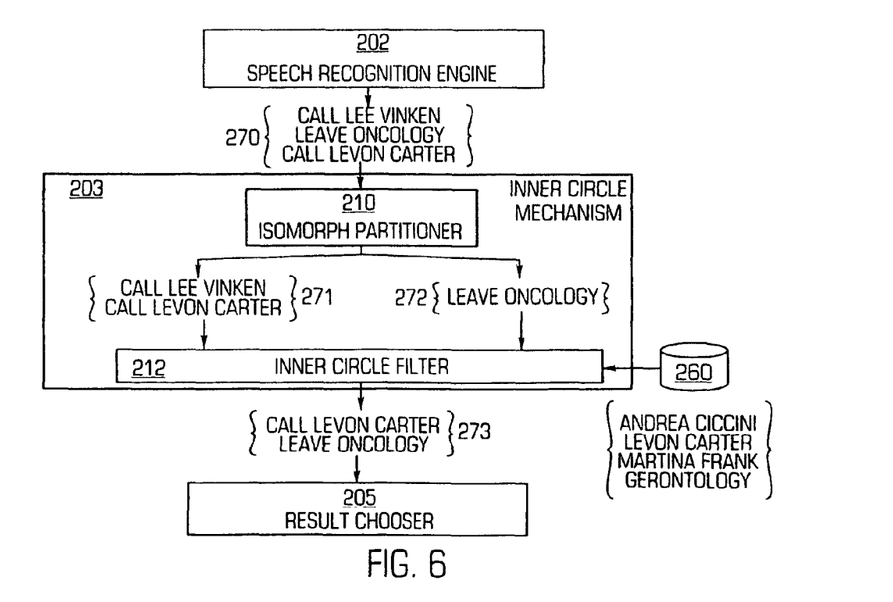
FIG. 6 is an example of the flow of speech recognition data through the Inner Circle mechanism shown in FIG. 5 in accordance with the invention.

FIG. 6 graphically represents an example of the flow of speech recognition data through the Inner Circle mechanism 203. In this example, suppose the speech recognition engine 202 provides an n-best result set 270 containing the following entries:

Call Lee Vinken
Leave Oncology
Call Levon Carter

In this example, suppose the speech recognition engine assigns the greatest probability of accuracy to the "Call Lee Vinken" result and the least probability of accuracy to the "Call Levon Carter" result. The speech recognition engine passes this result set and the probable accuracies of its elements to the isomorph partitioner 210, which outputs one subset 271 with the entries "Call Lee Vinken" and "Call Levon Carter" and a second subset 272 with the entry "Leave Oncology." The two entries "Call Lee Vinken" and "Call Levon Carter" in subset 271 are isomorphs because they both reference the same verb, "Call." The entry "Leave Oncology" is in a different subset 272 because it references a different verb, "Leave." The Inner Circle filter 212 examines the pair of entries in subset 271 to see if either of their arguments appears in the Inner Circle database 260, which contains the following entries:

Andrea Ciccini
Levon Carter
Martina Frank
Gerontology

The Inner Circle database 260, in this example, does not contain an entry for "Lee Vinken," and consequently the Inner Circle filter 212 discards the entry "Call Lee Vinken" from subset 271. Because subset 271 does not contain another pair of entries to examine, the Inner Circle filter 212 next examines the single entry in subset 272 to see if its argument appears in the Inner Circle database 260. The Inner Circle database 260 does not contain an entry for "Oncology," however the Inner Circle filter 212 does not discard the entry "Leave Oncology" because it is the only element in its isomorphic subset. Because there are no additional isomorphic subsets to examine, the Inner Circle filter assembles all the unfiltered entries into a new set 273 that it outputs to the Result Chooser 205. In this example, the set 273 that is output by the Inner Circle filter 212 contains the two entries, "Call Levon Carter" and "Leave Oncology." The Inner Circle filter 212 has consequently overridden the result "Call Lee Vinken," which the speech recognition engine 202 ranked as most probable.

Since the Inner Circle mechanism references the Inner Circle database, the Inner Circle database must be populated with data from each user before it is useful. The data in the Inner Circle database may include information about one or more entities that are associated with the user. For example, the entities may include individual people, a group of people, an organization or a group of organizations. In the preferred embodiment, the Inner Circle database may be populated by any combination of department configuration, buddies, explicit configuration, and automatic adaptation. When department configuration is used to populate the Inner Circle database, an administrator includes the names of a user's fellow department members in that user's Inner Circle data. For example, if a user is in the Tech Support department, all members of Tech Support are entered into that user's Inner Circle data. When buddies are used to populate the Inner Circle database, each Badge user's list of buddies (private address book entries that a Badge user can utter as arguments in voice commands) is included in that user's Inner Circle data. When explicit configuration is used to populate the Inner Circle database, an administrator explicitly adds the names of users, groups, or address book entries to any user's Inner Circle data. When automatic adaptation is used to populate the Inner Circle database, an administrator specifies a preference that automatically adds the name of a user, group, or address book entry to Badge user's Inner Circle data when that name is uttered in a voice command. For example, if a user utters the command "Call Amy Wong," the Genie prompts for confirmation, and then automatically adds "Amy Wong" to that user's Inner Circle data. If Amy Wong is already entered in that user's Inner Circle data, the call is connected immediately without prompting.

In the preferred embodiment, the Inner Circle data for each user may be removed by explicit configuration, aging, or both techniques. When explicit configuration is used to remove Inner Circle data, an administrator explicitly removes the names of users, groups, or address book entries from any user's Inner Circle data. When aging is used to remove Inner Circle data, the system periodically removes Inner Circle data that have been added through automatic adaptation if the data have not been mentioned in a voice command within some predetermined, adjustable time interval, such as 1 month. An administrator may also specify the number of days that elapse before aging occurs.

The second aspect of the present invention, the Say Or Spell mechanism (also shown in FIG. 5), is used to develop the grammar 204 that the speech recognition engine 202 uses. The grammar 204 comprises the set of all possible matches for any voice command. Because a voice command may contain both a verb and an argument, software instructions in the Say Or Spell mechanism develop the grammar 204 by combining every possible verb with every possible argument. In particular, the Say Or Spell instructions specify that an argument may be either any of the names in the database 130 or the spelling of any of the names in the database 130, and also that a verb may be either any of the verbs that are valid in a voice command or the spelling of any of these verbs. Without the Say Or Spell discovery, a speech recognition grammar typically contains only words and phrases. The discovery of the Say Or Spell mechanism enhances the existing art considerably, because it includes spellings in a grammar as well as the words and phrases, and the sounds of spellings are highly differentiable. In fact, the sounds of spellings are so highly differentiable that the speech recognition engine 202 will often return a result set containing a single match, thus bypassing the need for the Inner Circle mechanism 203 or the Result Chooser 205 to perform additional processing. Even when the spelling is incorrect, the engine may often find a single correct match, because the sequence of sounds formed by the letters of the misspelled word is still similar enough to the sequence of sounds formed by the letters in the correctly spelled word.

As an example of a simple grammar developed by the Say Or Spell mechanism, suppose the database contains the names "Maya Blair" and "May Lin," and suppose the set of possible verbs contains "Call" and "Page" (an actual database could contain many thousand entries). By combining every possible verb with every possible argument, the Say Or Spell mechanism develops a grammar containing the following entries:

Call Maya Blair           C-A-L-L Maya Blair
Call M-A-Y-A              C-A-L-L-M-A-Y-A
Call B-L-A-I-R            C-A-L-L-B-L-A-I-R
Call M-A-Y-A- B-L-A-I-R   C-A-L-L-M-A-Y-A- B-L-A-I-R
Call May Lin              C-A-L-L May Lin
Call M-A-Y                C-A-L-L-M-A-Y -continued

| | |
|---|---|
| Call L-I-N | C-A-L-L-L-I-N |
| Call M-A-Y-L-I-N | C-A-L-L-M-A-Y-L-I-N |
| Page Maya Blair | P-A-G-E Maya Blair |
| Page M-A-Y-A | P-A-G-E-M-A-Y-A |
| Page B-L-A-I-R | P-A-G-E-B-L-A-I-R |
| Page M-A-Y-A- B-L-A-I-R | P-A-G-E-M-A-Y-A- B-L-A-I-R |
| Page May Lin | P-A-G-E May Lin |
| Page M-A-Y | P-A-G-E-M-A-Y |
| Page L-I-N | P-A-G-E-L-I-N |
| Page M-A-Y-L-I-N | P-A-G-E-M-A-Y-L-I-N |

The Say Or Spell mechanism improves speech recognition accuracy while paradoxically increasing the size of the recognition space, an effect that is the exact opposite of the effect a large recognition space typically has on speech recognition. The Say Or Spell mechanism has an advantageous effect on speech recognition because spellings are not random. If spellings were random, the speech recognition engine would not be able to significantly narrow down the recognition space based on the sequence of letters. Because spellings are non-random however, the sequence of letters ultimately allows the speech recognition engine to differentiate among names.

Figure 7A:
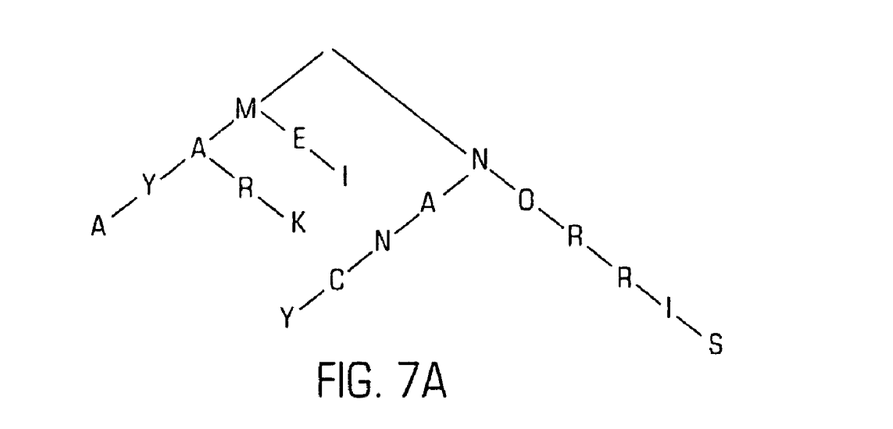
FIG. 7A-7D is an exemplary graphical representation of the differentiating effect that Say Or Spell spellings have on speech recognition, in accordance with the invention.
Figure 7B:
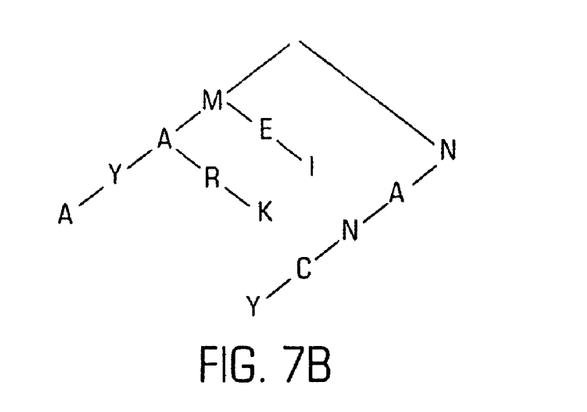
Figure 7C:
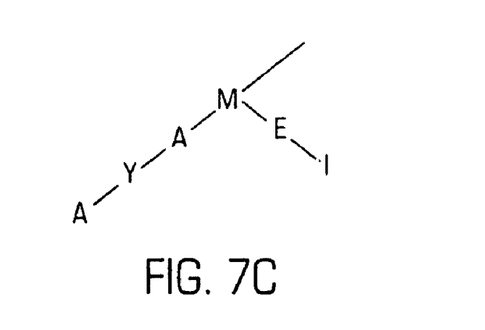
Figure 7D:
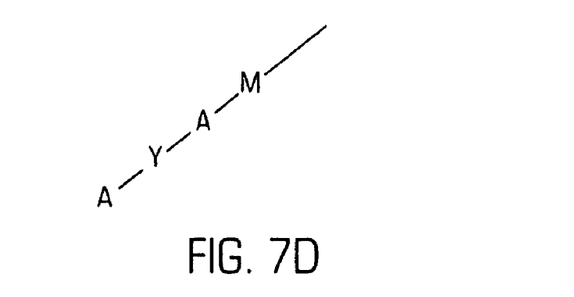

As an example of the effect spellings have on speech recognition, consider the branching trees graphically represented in FIGS. 7A-7D. FIG. 7A represents a recognition space containing spellings for the words "Maya," "Mark," "Mei," "Nancy," and "Norris." As an example of the differentiating effect spellings have on names in a recognition space, suppose a user spells the name "M-A-Y-A" in a voice command. As each letter is uttered, the recognition engine proceeds down a branching tree, probabilistically preferring certain branches and tentatively "pruning" less likely branches, attempting to isolate the most likely match. When the first letter "M" is uttered, the engine may prefer both the "M" branch and the "N" branch of the recognition space, because "M" and "N" are phonetically similar to the uttered sound, a state that is represented in FIG. 7A. When the second letter "A" is uttered, the engine may prefer the "M-A," the "M-E," and the "N-A" branches, because "A" and "E" are phonetically similar to the second uttered sound. However, the "N-O" branch is not preferred because the "O" sound is not phonetically similar to the uttered "A" sound, a state that is represented in FIG. 7B. When the third letter "Y" is uttered, the engine may prefer both the "M-A-Y" and the "M-E-I" branch, because "Y" and "I" are phonetically similar to the third uttered sound. However, the "N-A-N" and "M-A-R" branches are not preferred, because the uttered "Y" sound is not similar to "N" or "R," a state that is represented in FIG. 7C. Similarly, when the fourth letter "A" is uttered, the "M-E-I" branch is not preferred, and the correct match "M-A-Y-A" is identified, a state that is shown in FIG. 7D.

As illustrated in this example, the speech recognition engine treats each letter as a syllable, and the spelling consequently has the effect of providing a word or phrase with enough syllables to be uniquely identified in the recognition space. While it is possible for the speech recognition engine to confuse any given letter in a spelling with one or more other letters, it is significantly less likely for the engine to confuse the entire sequence of letters that compose a word with the sequence of letters that compose another word. The effect of spelling is to strongly distinguish one word from other words in the recognition space.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A wireless communications system, comprising:
a controlling computer;
one or more wireless access points connected to the controlling computer by a network;
a badge that communicates using a wireless protocol with one of the wireless access points; and
wherein the controlling computer further comprises a speech recognition system that receives a voice command from a particular user through the badge and interprets the voice command of the user to generate a set of voice commands interpretations, the speech recognition system further comprising an inner circle mechanism having an inner circle store containing a list of entities associated with the particular user, the inner circle mechanism improving the accuracy of the set of voice commands interpretations to generate a best fit voice command corresponding to the received voice command of the user.

2. The system of claim 1, wherein the inner circle store further comprises one or more entities which are capable of being arguments to a voice command of the user, the entities further comprise a name of one or more of an individual person, a group of people, an organization and a group of organizations.

3. The system of claim 1, wherein each voice command further comprises a verb portion and wherein the inner circle mechanism further comprises a partitioner that separates the set of the voice command interpretations into one or more isomorphic sets, each isomorphic set containing one or more voice command interpretations having a common verb portion and a filter that filters the one or more voice command interpretations in each isomorphic set to generate a preferred voice command interpretation for each isomorphic set.

4. The system of claim 3, wherein the voice command further comprises an argument portion.

5. The system of claim 4, wherein the filter further comprises a comparator that compares the argument of each voice command interpretation in each isomorphic set to the inner circle store and removes a particular voice command interpretation when the argument of the particular voice command interpretation does not match the inner circle store, unless none of the interpretations match the inner circle store, in which case none of the interpretations are removed.

6. The system of claim 1, wherein the speech recognition system further comprises a say or spell mechanism that permits the user to spell a voice command, making it sufficiently phonetically distinct from other voice commands allowed in the grammar, in order to reduce the chance of an incorrect voice command interpretation.

7. The system of claim 6, wherein each voice command further comprises a verb portion and an argument portion and wherein the say or spell mechanism further comprises a grammar store, the grammar store having for each verb of each voice command, a spelling of the verb of the voice command and for each argument of each voice command, a spelling of the argument so that the grammar store contains the combination of each spoken or spelled verb and each spoken or spelled argument for the voice commands.

8. The system of claim 7, wherein the speech recognition system further comprises a mechanism that permits the user to spell a voice command verb and argument using the grammar store of the say or spell mechanism.

9. A wireless communications system, comprising:

a controlling computer;

one or more wireless access points connected to the controlling computer by a network;

a badge that communicates using a wireless protocol with one of the wireless access points; and wherein the controlling computer further comprises a speech recognition system that receives a voice command from a particular user through the badge and interprets the voice command of the user to generate a set of resulting voice command interpretations, the speech recognition system further comprising a say or spell mechanism that permits the user to spell a voice command, making it sufficiently phonetically distinct from other voice commands allowed in the grammar, in order to reduce the chance of an incorrect voice command interpretation.

10. A computer implemented speech recognition system, comprising:

a speech recognition engine that generates a set of voice command interpretations based on a voice command of a user; and an inner circle mechanism, connected to the speech recognition engine, the inner circle mechanism having an inner circle store containing a list of entities associated with the user, the inner circle mechanism improving the accuracy of the set of voice commands interpretations to generate a best fit voice command corresponding to the voice command of the user.

11. The system of claim 10, wherein the inner circle store further comprises one or more entities which are arguments to a voice command of the user, the entities further comprise a name of one or more of an individual person, a group of people, an organization and a group of organizations.

12. The system of claim 11, wherein each voice command further comprises a verb portion; the inner circle mechanism further comprises a partitioner that separates the set of the voice command interpretations into one or more isomorphic sets, each isomorphic set containing one or more voice command interpretations having a common verb portion and a filter that filters the one or more voice command interpretations in each isomorphic set to generate one or more preferred voice command interpretations for each isomorphic set.

13. The system of claim 12, wherein the voice command further comprises an argument portion.

14. The system of claim 13, wherein the filter further comprises a comparator that compares the argument of each voice command interpretation in each isomorphic set to the inner circle store and removes a particular voice command interpretation when the argument of the particular voice command interpretation does not match the entities in the inner circle store.

15. The system of claim 10, wherein the speech recognition engine further comprises a say or spell mechanism that permits the user to spell a voice command, making it sufficiently phonetically distinct from other voice commands allowed in the grammar, in order to reduce the chance of incorrect voice command interpretations.

16. The system of claim 15, wherein each voice command further comprises a verb portion and an argument portion and wherein the say or spell mechanism further comprises a grammar store, the grammar store having for each verb of each voice command, a spelling of the verb of the voice command and for each argument of each voice command, a spelling of the argument so that the grammar store contains the combination of each verb and each argument for the voice commands.

17. The system of claim 16, wherein the speech recognition system further comprises a spelling mechanism that permits the user to spell a voice command verb and argument using the grammar store of the say or spell mechanism.

* * * * *